Sept. 8, 1970  I. C. SELLERS  3,527,093
INSTRUMENTS FOR TESTING THE ADHESION OF COATINGS TO SURFACES
Filed Oct. 18, 1968

INVENTOR
IAN C. SELLERS
BY
Norris & Bateman

United States Patent Office 3,527,093
Patented Sept. 8, 1970

3,527,093
INSTRUMENTS FOR TESTING THE ADHESION OF COATINGS TO SURFACES
Ian C. Sellers, Mobberley, England, assignor to Elcometer Instruments Limited, Droylsden, England, a body corporate of Great Britain
Filed Oct. 18, 1968, Ser. No. 768,657
Claims priority, application Great Britain, Nov. 11, 1967, 51,407/67
Int. Cl. G01n 19/04
U.S. Cl. 73—150       4 Claims

ABSTRACT OF THE DISCLOSURE

An instrument for testing the adhesion of a coating to surfaces including a body closed at its lower end having a plurality of Belleville washers housed within and a barrel capable of sliding in a bore in the body. A screwed spindle passes through the body, the Belleville washers, and the barrel, with a socket being provided on the lower end of the spindle. A dolly member is mounted on the socket and a predetermined area of the coating to be tested is secured thereto by an adhesive. A nut on the spindle is used to compress the Belleville washers and apply a tractive force to the coating at right angles to a plane passing through the coated surface.

---

This invention relates to improvements in instruments for testing the adhesion of coatings to surfaces.

The object of the invention is an instrument for measuring and indicating the tractive effort necessary to separate a coating such as paint, plating or the like from a surface to which it has been applied without applying any torsion to the coating.

According to the invention the instrument for testing the adhesion of a coating to a surface comprises a body closed at the lower end, to house a plurality of Belleville washers or the like with a screwed spindle passing therethrough the upper end of the body being closed by a barrel capable of sliding in the body and through which the spindle passes, and a socket on the lower end of the spindle to receive a dolly member to which a predetermined area of the coating to be tested is secured by an adhesive, the tractive effort being applied by screwing a nut or handwheel onto the spindle to compress the Belleville washers to apply a tractive force to the coating at right angles to a plane passing through the surface.

The invention will be described with reference to the accompanying drawings.

Figure 1:
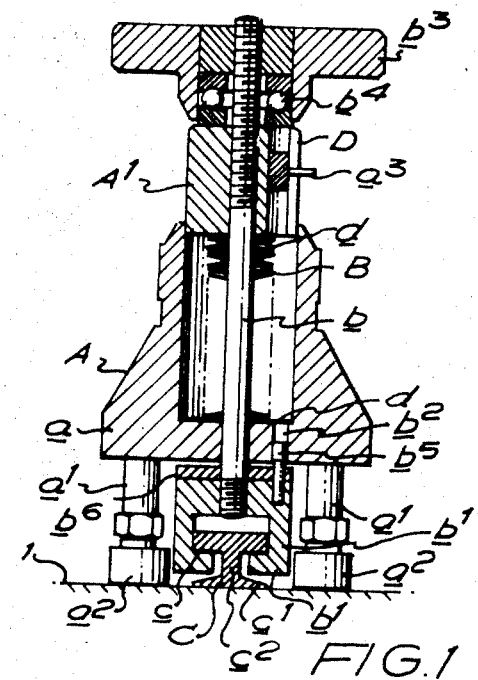
FIG. 1 is a vertical section through one form of the instrument.

In the instrument shown in FIG. 1 is constructed with a preferably cylindrical body A closed at its lower end and open at its upper end. The body A houses a plurality of Belleville washers B. A screwed spindle $b$ passes through the base of the body A and the Belleville washers B and extends upwards above the top of the body.

The open end of the body A is closed by a cylindrical barrel $A^1$ through which the spindle $b$ passes and is capable of sliding in the body A. The lower end of the spindle $b$ is formed with a slotted socket $b^1$ in the shape of a claw the upper end of which engages the underside of the base $a$ of the body A with a buffer $b^6$ therebetween and having a pin or projection $b^5$ to enter an aperture $b^2$ to prevent rotation of the spindle $b$ relatively thereto. A handwheel or nut $b^3$ is screwed onto the upper end of the spindle $b$.

The base of the body is supported on screwed legs $a^1$ preferably three, each formed with a ball on the lower end to enter a socket on a foot $a^2$ upon which the body stands.

A ball race $b^4$ is applied to the upper end of the spindle $b$ to rest on the upper surface of the barrel $A^1$ to reduce friction on the handwheel or nut $b^3$ and to prevent the barrel $A^1$ from rotating.

A member C in the form of a dolly having a cylindrical upper portion $c$ to engage the slot in the socket $b^1$ and a lower portion $c^1$ separated from the upper surface by a portion $c^2$ of reduced diameter is mounted in the socket $b^1$. The lower surface $c^1$ of the member C is formed of a predetermined area for example 0.5 square inch and is secured to a painted or like coated surface by an adhesive such as that sold as Eastman Kodak 910 or other adhesive.

The member C having been inserted into the socket $b^1$ a tractive effort is applied to the member C in the socket by the rotation of the handwheel or nut $b^3$ which compresses the Belleville washers B. The tractive effort may be continued until the coating on the surface lifts or cracks or to a predetermined position on a scale D.

The scale D on the barrel $A^1$ is calibrated in pounds per square or other units with an indicator pointer $a^3$ to indicate the tractive effort applied to the surface, the calibration being carried out from curves supplied with the Belleville washers, the number of washers employed being governed by the maximum tractive effort required.

The indicator $a^3$ is a fractional device and when the test has been completed and the dolly C has broken from the surface $b$ the indicator $a^3$ lifts upwards so that the space between the buffer $b^6$ and the undersigned of the base $a$ is closed, consequently the barrel $A^1$ lifts upwards together with the indicator $a^3$. Therefore, when the test measurement is taken it is not possible unless the indicator $a^3$ is of a friction type to take a satisfactory reading at the time of failure.

A scale correction shim $d$ may be provided above and below the Belleville washers B. This arrangement is suitable for applying a tractive effort of 500 and 1,000 lbs.

Figure 2:
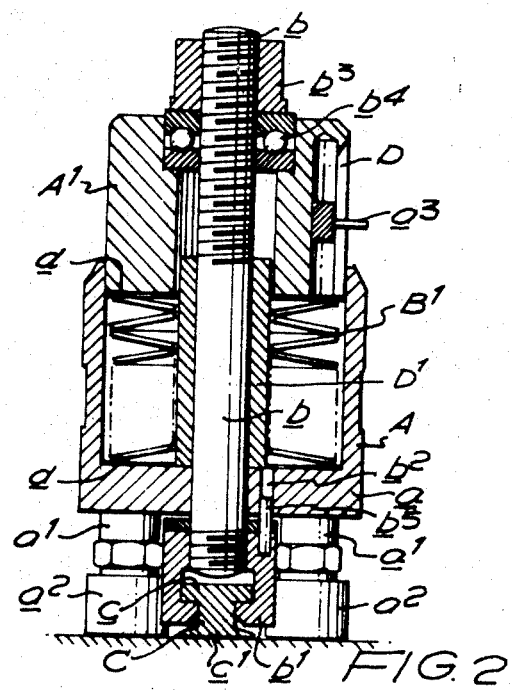
FIG. 2 is a similar view of a larger instrument.

The instrument shown in FIG. 2 is suitable for applying a tractive effort of 2,000 and 4,000 lbs., and is similar to the construction shown in FIG. 1 except that the Belleville washers $B^1$ are mounted outside a tubular sleeve D extending upwards from the base $a$ of the body A to the upper end of thereof through which the spindle $b$ passes, the Belleville washers $B^1$ being formed with a central hole or aperture to receive the sleeve D and the barrel $A^1$ is formed with a central counter base to receive the upper end of the sleeve.

It has been found in use that when testing on thin test panels there may be a tendency for the panel 1 itself to buckle under test, and therefore give a wrong reading. The foot $a^2$ accordingly may rest on a ring with the dolly protruding through a central hole in this ring. The test panel then stands up to more pull before buckling.

What I claim is:

1. An instrument for testing the adhesion of coatings to surfaces comprising a body closed at the lower end, a plurality of Belleville washers housed with the body, a barrel capable of sliding in a bore in the body, a screwed spindle passing through the body and through the Belleville washers and through the barrel, a socket on the lower end of the spindle, a dolly member mounted thereon to which a predetermined area of the coating to be tested is secured by adhesive, a nut on the spindle to compress the Belleville washers and apply a tractive force to the coating at right angles to a plane passing through the coated surface.

2. An instrument for testing the adhesion of coatings to surfaces as in claim 1 incorporating a pin engaging the base of the body and the socket to prevent rotation of the dolly member.

3. An instrument for testing the adhesion of coatings to surfaces as in claim 1 having a sleeve surrounding the spindle on which the Belleville washers are mounted.

4. An instrument for testing the adhesion of coatings to surfaces as in claim 1 having an indicator pointer mounted on the barrel and a calibrated scale over which the pointer moves to indicate the tractive effort applied to the coating.

References Cited
UNITED STATES PATENTS

| | | | |
|---|---|---|---|
| 2,113,725 | 4/1938 | Goldman | 73—150 |
| 3,289,458 | 12/1966 | Deichert et al. | 73—150 |

LOUIS R. PRINCE, Primary Examiner

W. A. HENRY, II, Assistant Examiner